(12) United States Patent
Chen (10) Patent No.: US 12,504,330 B2
(45) Date of Patent: Dec. 23, 2025

(54) ELECTRONIC DETECTION SYSTEM (71) Applicant: ULTRA DISPLAY TECHNOLOGY CORP., Taipei (TW)

(72) Inventor: Hsien-Te Chen, Taipei (TW)

(73) Assignee: ULTRA DISPLAY TECHNOLOGY CORP., Taipei (TW)

(*) Notice: Subject to any disclaimer, the term of this patent is extended or adjusted under 35 U.S.C. 154(b) by 111 days.

(21) Appl. No.: 18/646,379

(22) Filed: Apr. 25, 2024

(65) Prior Publication Data
US 2024/0361185 A1 Oct. 31, 2024

Related U.S. Application Data

(60) Provisional application No. 63/462,870, filed on Apr. 28, 2023.

(51) Int. Cl.
*G01J 9/02* (2006.01)
*G01J 1/42* (2006.01)

(52) U.S. Cl.
CPC .......... *G01J 9/0246* (2013.01); *G01J 1/4257* (2013.01); *G01J 2009/0284* (2013.01)

(58) Field of Classification Search
CPC .............. G01J 1/4257; G01J 2001/4252; G01J 9/0246; G01J 2009/0242; G01J 2009/0284
See application file for complete search history.

(56) References Cited

U.S. PATENT DOCUMENTS 10,012,520 B2 * 7/2018 Ip .......................... G01D 5/34
2025/0012847 A1 * 1/2025 Hasegawa .......... G01R 31/2635

* cited by examiner

*Primary Examiner* — Kevin K Pyo
(74) *Attorney, Agent, or Firm* — Muncy, Geissler, Olds & Lowe (57) ABSTRACT

An electronic detection system includes an electronic device, a detector and a memory. The electronic device includes a circuit substrate, a plurality of photoelectric components, and a plurality of tunable current source circuits. Each photoelectric component has one or more peak emission wavelengths in response to a plurality of current values. The tunable current source circuits are disposed on the circuit substrate and electrically connected to the photoelectric components. The detector captures a feature value of a corresponding one of the photoelectric components. One or more lookup tables stored in the memory are based on the feature values and the current values of the photoelectric components. Each tunable current source circuit transmits an input current to a corresponding one of the photoelectric components in response to the lookup table(s) to perform a selected peak emission wavelength.

10 Claims, 7 Drawing Sheets

ELECTRONIC DETECTION SYSTEM

CROSS REFERENCE TO RELATED APPLICATIONS

The non-provisional patent application claims priority to U.S. provisional patent application with Ser. No. 63/462,870 filed on Apr. 28, 2023. This and all other extrinsic materials discussed herein are incorporated by reference in their entirety.

BACKGROUND

Technology Field

The present disclosure relates to a detection system and, in particular, to an electronic detection system having a wavelength compensation function.

Description of Related Art

While the world is paying attention to the future display technology, LEDs (light-emitting diodes), in particular, the micro LED (μLED), are considered as one of the most promising technologies. In brief, micro LED is a technology of miniaturizing and rearranging LEDs, thereby arranging millions or even tens of millions of dies, which are smaller than 100 microns and thinner than a hair, in an array on a substrate. Compared with the current OLED (organic light-emitting diode) display technology, micro LED display device is also a self-luminous device but utilizes different material. Therefore, the micro LED display device can solve the screen burn-in issue, which is the most deadly problem in OLED display device. Besides, the micro LED display device further has the advantages of low power consumption, high contrast, wide color gamut, high luminance, small and thin size, light weight and energy saving. Therefore, major manufacturers around the world are scrambling to invest in the research and development of micro LED technology.

However, during the manufacturing process of LEDs or micro LEDs, even if the same current is input to the LEDs or micro LEDs produced in the same batch, the wavelengths of the lights emitted from these LEDs or micro LEDs may be different due to process variations. That is, the LEDs or micro LEDs produced in the same batch may not have exactly the same peak wavelength. Thus, these LEDs or micro LEDs may have the chromatic aberration issue.

SUMMARY

One or more exemplary embodiments of this disclosure are to provide an electronic detection system, which has the wavelength compensation function.

An electronic detection system of one exemplary embodiment includes an electronic device, a detector and a memory. The electronic device includes a circuit substrate, a plurality of photoelectric components and a plurality of tunable current source circuits. The photoelectric components are electrically connected to the circuit substrate, and each of the photoelectric components has one or more peak emission wavelengths in response to a plurality of current values. The tunable current source circuits are disposed on the circuit substrate and electrically connected to the photoelectric components. The detector is separated from the electronic device with a predetermined distance, and the detector captures a feature value of a corresponding one of the photoelectric components. The memory stores one or more lookup tables, and the one or more lookup tables are based on the feature values and the current values of the photoelectric components. Each of the tunable current source circuits transmits an input current to a corresponding one of the photoelectric components in response to the one or more lookup tables to perform a selected one of the peak emission wavelengths.

In one exemplary embodiment, the feature value includes an emission wavelength value of the corresponding one of the photoelectric components.

In one exemplary embodiment, the feature value further includes an environmental temperature value corresponding to the emission wavelength value.

In one exemplary embodiment, the feature value further includes a brightness value corresponding to the corresponding one of the photoelectric components.

In one exemplary embodiment, the detector and the photoelectric components are arranged in a one-on-multiple manner, and the detector captures an overall image of the photoelectric components.

In one exemplary embodiment, the electronic device includes a plurality of pixels, and each of the pixels includes one or at least two of the photoelectric components.

In one exemplary embodiment, a wavelength range of the peak emission wavelength of each of the photoelectric components is within 10 nm.

In one exemplary embodiment, a wavelength range of the peak emission wavelength of each of the photoelectric components is 30 nm or more.

In one exemplary embodiment, the photoelectric components are arranged on the circuit substrate, a carrier board or a stamp.

In one exemplary embodiment, the electronic detection system further includes a Michelson interferometer and a functional analysis device. The Michelson interferometer is disposed between the detector and the electronic device. The functional analysis device is electrically connected to the detector and the Michelson interferometer. The lights emitted from the photoelectric components are processed by the Michelson interferometer and then absorbed by the detector so as to be converted into electrical signals, and the electrical signals are transmitted to the functional analysis device.

As mentioned above, in the electronic detection system of this disclosure, each photoelectric component has one or more peak emission wavelengths in response to a plurality of current values, a plurality of tunable current source circuits are electrically connected to the photoelectric components, the detector captures a feature value of a corresponding one of the photoelectric components, and the memory stores one or more lookup tables, which are based on the feature values and the current values of the photoelectric components. Each of the tunable current source circuits transmits an input current to a corresponding one of the photoelectric components in response to the one or more lookup tables to perform a selected one of the peak emission wavelengths. According to this design, the electronic detection system of this disclosure can achieve the wavelength compensation function.

BRIEF DESCRIPTION OF THE DRAWINGS

The disclosure will become more fully understood from the detailed description and accompanying drawings, which are given for illustration only, and thus are not limitative of the present disclosure, and wherein.

DETAILED DESCRIPTION OF THE DISCLOSURE

The present disclosure will be apparent from the following detailed description, which proceeds with reference to the accompanying drawings, wherein the same references relate to the same elements.

Figure 1A:
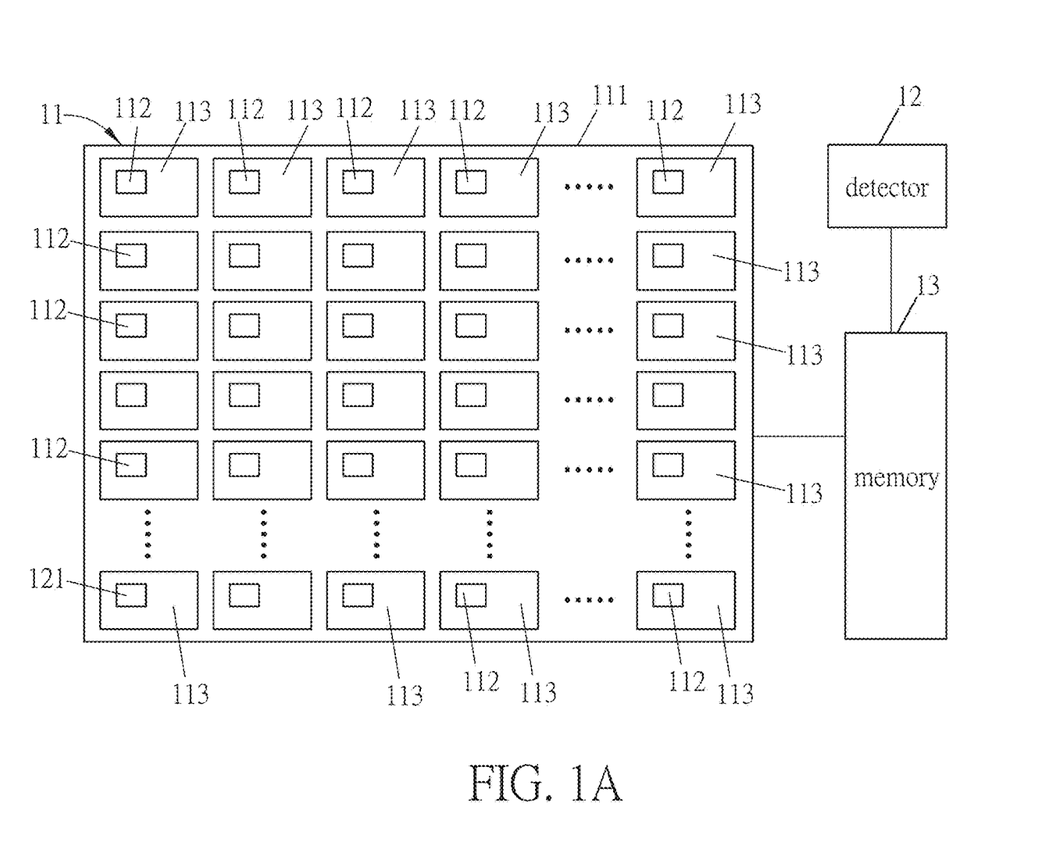
FIG. 1A is a block diagram of an electronic detection system according to an embodiment of this disclosure.
Figure 1B:
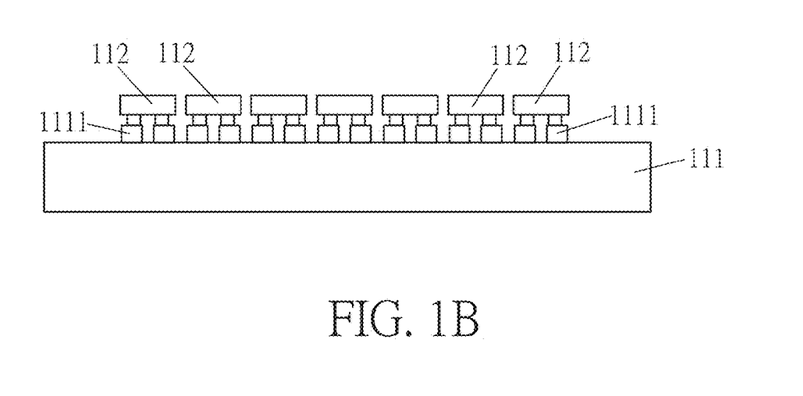
FIG. 1B is a schematic diagram showing the circuit substrate and the photoelectric components of the electronic device in the electronic detection system of FIG. 1A.
Figure 1C:
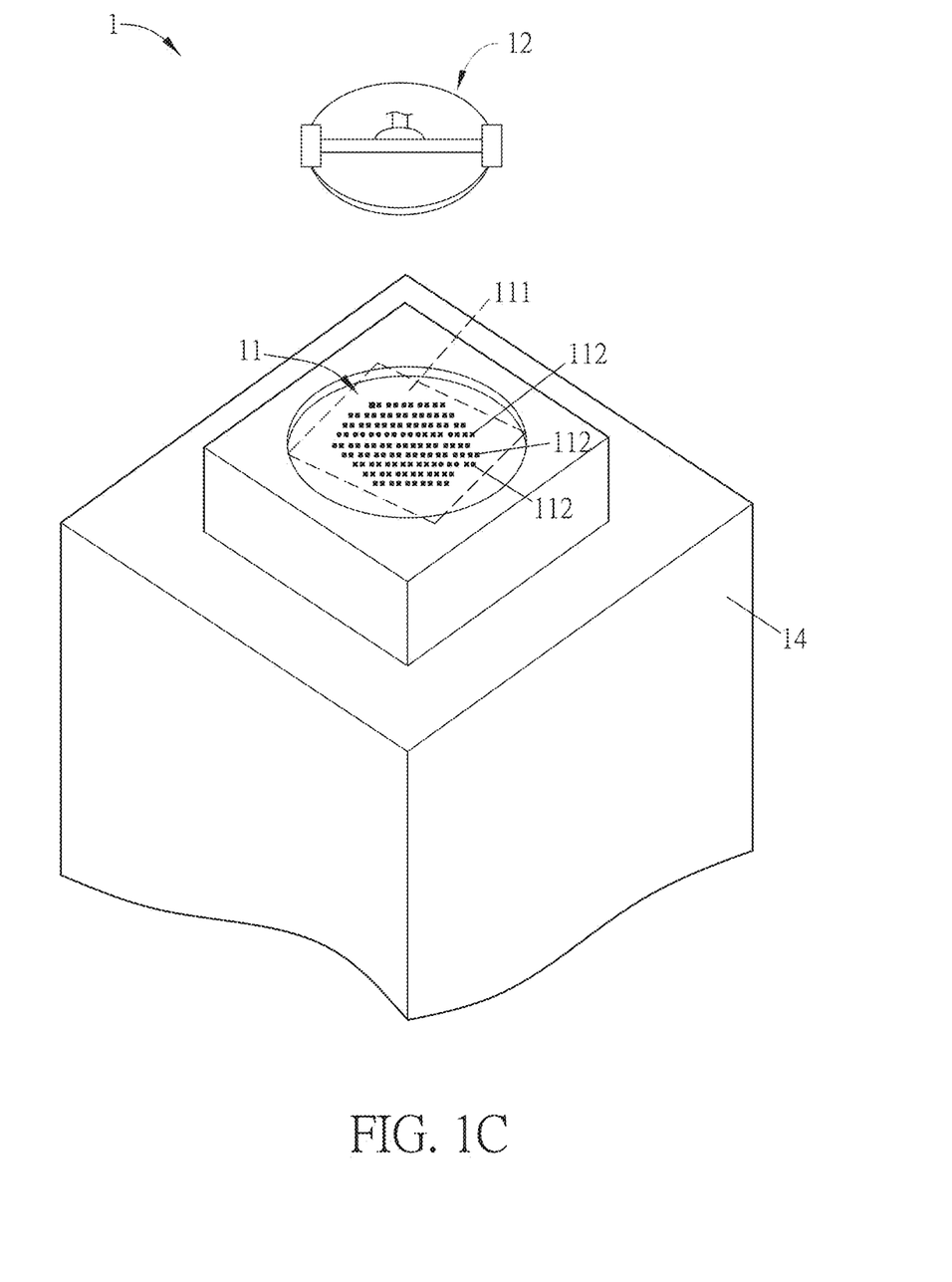
FIG. 1C is a schematic diagram showing the relative positions of the circuit substrate and the photoelectric components of the electronic device and the detector in the electronic detection system of FIG. 1A.

FIG. 1A is a block diagram of an electronic detection system according to an embodiment of this disclosure, FIG. 1B is a schematic diagram showing the circuit substrate and the photoelectric components of the electronic device in the electronic detection system of FIG. 1A, and FIG. 1C is a schematic diagram showing the relative positions of the circuit substrate and the photoelectric components of the electronic device and the detector in the electronic detection system of FIG. 1A. In this embodiment, FIG. 1C does not show the memory 13 of the electronic detection system 1, and the electronic device 11 is arranged on a working platform 14 of the electronic detection system 1.

Referring to FIGS. 1A to 1C, the electronic detection system 1 of this embodiment includes an electronic device 11, a detector 12, and a memory 13.

The electronic device 11 includes a circuit substrate 111, a plurality of photoelectric components 112, and a plurality of tunable current source circuits 113. The circuit substrate 111 is a circuit board used to electrically connect the photoelectric components 112, and it can be made of light-transmitting or non-light-transmitting material. The circuit substrate 111 can be electrically connected to the photoelectric components 112 in a freely detachable manner or in any of other ways. In this embodiment, as shown in FIG. 1B, the surface of the circuit substrate 111 is provided with a plurality of connection pads 1111, which are separately arranged, and these connection pads 1111 are arranged corresponding to a plurality of electrodes of the photoelectric components 112. The photoelectric components 112 of this embodiment can be, for example but not limited to, provided in a flip-chip manner and connected to the corresponding connection pads 1111 of the circuit substrate 111 to transmit current through the connection pads 1111 and the electrodes to drive the photoelectric components 112 to emit light. To be noted, the above-mentioned arrangement is for an example, and this disclosure is not limited thereto. In other embodiments, the photoelectric components 112 can be disposed on another medium other than the circuit substrate 111. For example, the photoelectric components 112 can be disposed on a carrier board (e.g. a native substrate) or a stamp, and then the carrier board or stamp is inverted so that the electrodes of each photoelectric component 112 can electrically connect to the corresponding connection pads 1111, thereby electrically connecting the photoelectric components 112 and the circuit substrate 111. In some embodiments, the electrodes of the photoelectric components 112 can be vertical-structure electrodes or horizontal-structure electrodes, and this disclosure is not limited thereto.

Each of the photoelectric components 112 has one or more peak emission wavelengths in response to a plurality of current values. Specifically, in one embodiment, a plurality of currents can be inputted to each photoelectric component 112 respectively, so that each photoelectric component 112 has a peak emission wavelength. In one embodiment, a plurality of currents can be inputted to each photoelectric component 112 respectively, so that each photoelectric component 112 has a plurality of peak emission wavelengths. The photoelectric component 112 in this embodiment is, for example, an LED, but this disclosure is not limited thereto. In different embodiments, the photoelectric component 112 can be a Mini LED or a Micro LED.

In one embodiment, the photoelectric components 112 can be arranged in an array. The electronic device 11 can be a display device having a plurality of pixels, and each pixel can include one or at least two photoelectric components 112. In this embodiment, when each pixel includes one photoelectric component 112, the electronic device 11 can be a monochromatic or multicolor (polychromatic) display device. In addition, when each pixel includes two or more (e.g. three) photoelectric components 112, the electronic device 11 can be a multicolor (polychromatic) display device.

In one embodiment, when the wavelength range (deviation) of the peak emission wavelengths of any two of the photoelectric components 112 is within 10 nm, the photoelectric components 112 can be regarded as monochromatic. In one embodiment, if the variation of wavelength range of the peak emission wavelengths of each photoelectric component 112 is small (e.g. equal to or less than 10 nm (the variation of wavelength range ≤10 nm)), the photoelectric components 112 can be regarded as monochromatic.

In one embodiment, when the wavelength range of the peak emission wavelengths of any two of the photoelectric components 112 is at least 30 nm, the photoelectric components 112 can be regarded as having multiple colors (polychromatic). In one embodiment, when the wavelength range of the peak emission wavelength of each photoelectric component 112 has a larger variation (e.g. at least 30 nm), the photoelectric component 112 can be regarded as having multiple colors. In one embodiment, the photoelectric components 112 are variable-wavelength components. Each photoelectric component 112 has a plurality of peak emission wavelengths in response to a plurality of current values, and two adjacent peak emission wavelengths of one photoelectric component 112 have a wavelength range (deviation) that is at least 30 nm. In this case, the photoelectric components 112 can be regarded as having multiple colors.

In one embodiment, one or more photoelectric components 112 can be arranged in one pixel. In this case, when the plurality of photoelectric components 112 are arranged in one pixel, according to the respective input currents of these photoelectric components 112, one of the photoelectric components 112 can function as a red LED, another photoelectric component 112 can function as a green LED, and yet another photoelectric component 112 can function as a blue LED. In addition, when one photoelectric component 112 is arranged in one pixel, the photoelectric component 112 can dynamically function as a red LED, a green LED, or a blue LED according to the input current. In one embodiment, when the photoelectric component 112 is a wavelength-variable LED, it can operate in a wavelength range of at least 30 nm.

The detector 12 is separated from the electronic device 1 with a predetermined distance, and the detector 12 can capture a feature value of at least corresponding one of the photoelectric components 112. The feature value may include an emission wavelength value of the corresponding photoelectric component 112. In addition, the feature value may further include an environmental temperature value corresponding to the emission wavelength value. In other words, the emission wavelength value captured by the detector 12 varies according to different environmental temperature values. In one embodiment, the feature value may further include a brightness value of the corresponding photoelectric component 112.

In this embodiment, the detector 12 and the photoelectric components 112 are arranged in a one-on-multiple manner, and the detector 12 can capture an overall image of the photoelectric components 112, thereby capturing the feature value of each one of the photoelectric components 112. To be noted, the above arrangement is for an illustration, and this disclosure is not limited thereto. In different embodiments, the detector 12 can capture only a part of the overall image. That is, the detector 12 can capture the feature values of part or some of one or more photoelectric components 112. In one embodiment, the detector 12 can be a camera, a charge coupled device (CCD), or a CMOS image sensor, and this disclosure is not limited thereto.

The memory 13 is electrically connected to the detector 12 and the electronic device 11 and the memory 13 can store one or more lookup tables, which are defined based on the current values and the feature values of the photoelectric components 112. In other words, the lookup table(s) contains the corresponding relationship between the current values and the feature values of the photoelectric components 112.

Please refer to the following Table 1 and Table 2, which are examples of lookup tables stored in the memory 13 respectively. Table 1 shows the corresponding relationship between the emission wavelength values and input current values of corresponding photoelectric components 112, and Table 2 shows the functions of the emission wavelength values and the input current values of corresponding photoelectric components 112. In this case, the function as shown in Table 2 can be related to the environmental temperatures.

TABLE 1

| I1 | W1 |
|---|---|
| I2 | W2 |
| I3 | W3 |
| . | . |
| . | . |
| . | . |
| In − 1 | Wn − 1 |
| In | Wn |

TABLE 2

| I1 | F(W1) |
|---|---|
| I2 | F(W2) |
| I3 | F(W3) |
| . | . |
| . | . |
| . | . |
| In − 1 | F(Wn − 1) |
| In | F(Wn) |

To be noted, the memory unit 13 can be arranged on the circuit substrate 111 in a direct manner by, for example, deposition or bonding, or in an indirect manner. This disclosure is not limited thereto. If the memory 13 is independent of the electronic device 11 and is arranged on the circuit substrate 111 in an indirect manner, it can be connected to the electronic device 11 and the detector 12 through wired or wireless communication. In some embodiments, the memory 13 is a non-transitory computer readable storage medium. In some embodiments, the memory 13 may include read-only memory (ROM), flash memory, field-programmable gate array (FPGA), or solid state disk (SSD), or any of other types of memory, or any combinations thereof, and this disclosure is not limited thereto. In addition, the information stored in the memory unit 13 (lookup table) is not limited to information such as emission wavelength values, environmental temperature values, light intensity information of photoelectric components, and/or environmental circumstances, and the likes.

The tunable current source circuits 113 are disposed on the circuit substrate 111. In addition, the tunable current source circuits 113 are arranged corresponding to and electrically connected to the photoelectric components 112. Each of the tunable current source circuits 113 transmits an input current to a corresponding one of the photoelectric components 112 in response to the one or more lookup tables to perform a selected one of the peak emission wavelengths. In this case, the selected peak emission wavelength can be determined by the user's desired display color. In this embodiment, each tunable current source circuit 113 may include a TFT circuit, and each tunable current source circuit 113 can respond to the one or more lookup tables so as to transmit the input current to the corresponding photoelectric component 112, thereby making each photoelectric component 112 perform a selected peak emission wavelength.

Specifically, after the tunable current source circuit 113 lights the photoelectric components 112 (e.g. an LED array), the detector 12 can detect the wavelengths of each photoelectric component 112 under different currents provided by the tunable current source circuit 113. Then, the overall image detected by the detector 12 can be used to further analyze the wavelengths or/and temperatures in pixel level, and the tunable current source circuit 113 can determine an input current corresponding to the selected peak emission wavelength responding to the analysis result of the above-mentioned overall image, and with utilizing the aforementioned lookup table(s), and transmit the determined input current to a specific one or more photoelectric components 112. Accordingly, the specific one or more photoelectric components 112 can perform the selected peak emission wavelength, thereby performing wavelength compensation so as to make the peak emission wavelengths of the photoelectric components 112 be consistent (i.e., the color is consistent). In other words, in the electronic detection system 1 of this embodiment, the detector 12 can detect the lights emitted from the photoelectric components 112 to obtain the wavelengths or/and temperature landscapes of the overall image, and the result of fully wavelength mapping data or/and fully temperature mapping data can be analyzed with utilizing the lookup table(s) stored in the memory 13 on or after the detection, thereby utilizing the tunable current source circuits 113 to make the peak emission wavelengths of all photoelectric components 112 consistent. In this case, the mapping data may be, for example, the corresponding relationship between wavelengths and currents.

Figure 2:
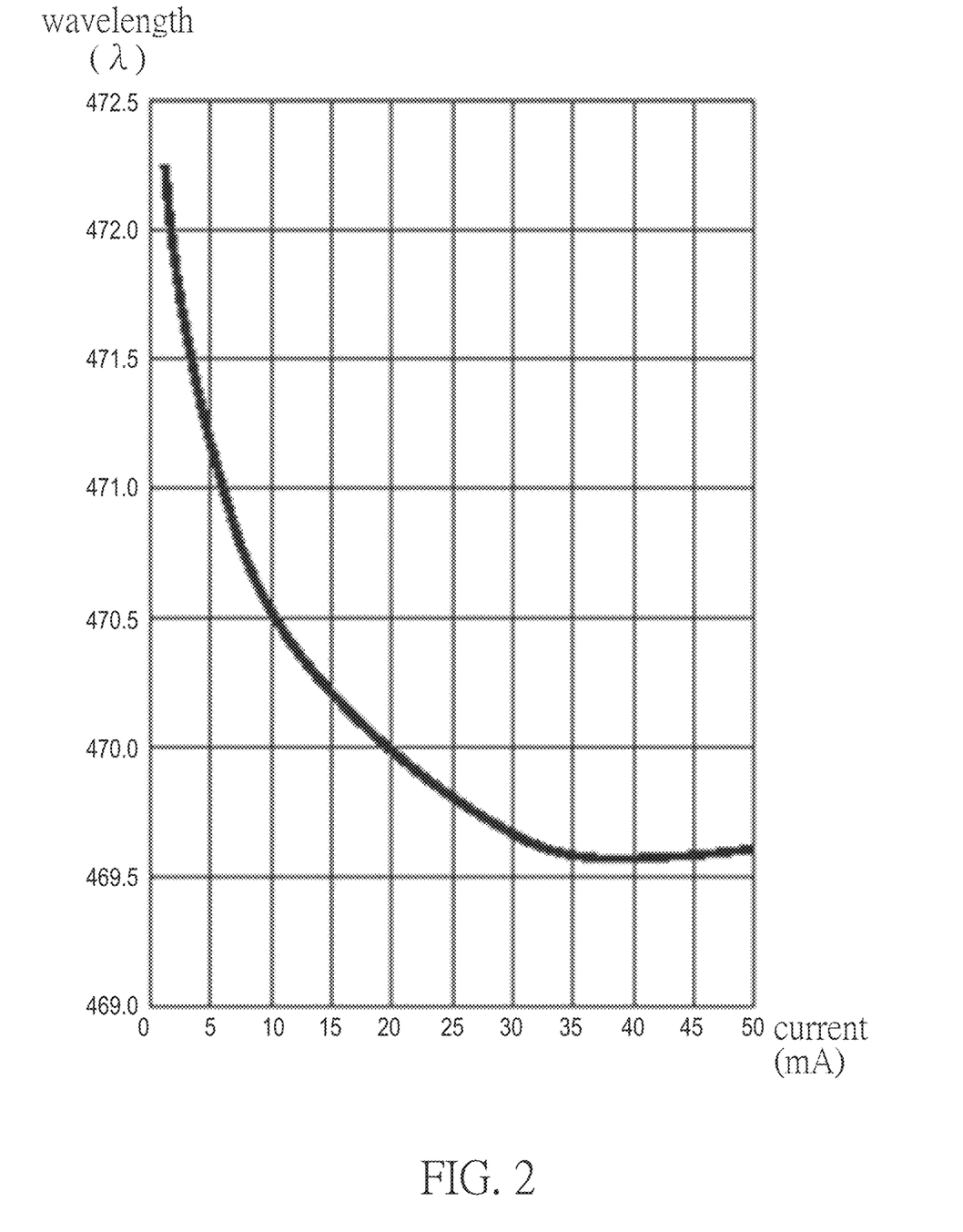
FIG. 2 is a schematic chart showing the relationship between the current and the dominate wavelength of the photoelectric component according to an embodiment of this disclosure.

FIG. 2 is a schematic chart showing the relationship between the current and the dominate wavelength of the photoelectric component according to an embodiment of this disclosure. In this case, FIG. 2 shows the relationship between the dominate wavelength and the input current of a blue LED when the environmental temperature is 25° C. As shown in FIG. 2, the wavelength of the blue LED is a function of current. That is, different wavelengths can be obtained by inputting different currents. In addition, different relationship functions between the dominate wavelength and the input current can be defined at different environmental temperatures. Therefore, in order to perform the selected one of the peak emission wavelengths, the current corresponding to the selected peak emission wavelength should be inputted. For example, when the environmental temperature is 25° C., and the selected peak emission wavelength is 470.5 nm, the input current needs to be 10 mA. In another case, if the selected peak emission wavelength is 470 nm, the input current needs to be 20 mA.

To be noted, when the wavelength compensation is performed to make the peak emission wavelengths of LEDs to be consistent, the brightness of different LEDs will vary due to different input currents, which will lead to uneven brightness issue. The following discussion takes two LEDs as an example to illustrate a solution of this uneven brightness issue.

This discussion assumes that a first LED (LED1) and a second LED (LED2) have the same peak emission wavelength, but will be inputted with different currents I1 and I2 (assuming I2>I1), respectively. Different input currents will cause different brightness of the first and second LEDs (LED1 and LED2). In order to make the brightness of the first and second LEDs (LED1 and LED2) to be the same, in one embodiment, the pulse width modulation (PWM) technology can be used to control the duty ratio of the input current I2 for the second LED (LED2). For example, the duty ratio of the input current I2 inputted to the second LED (LED2) can be equal to 90% or 85%, so that the brightness of the second LED (LED2) can be controlled to be the same as that of the first LED (LED1).

Figure 3A:
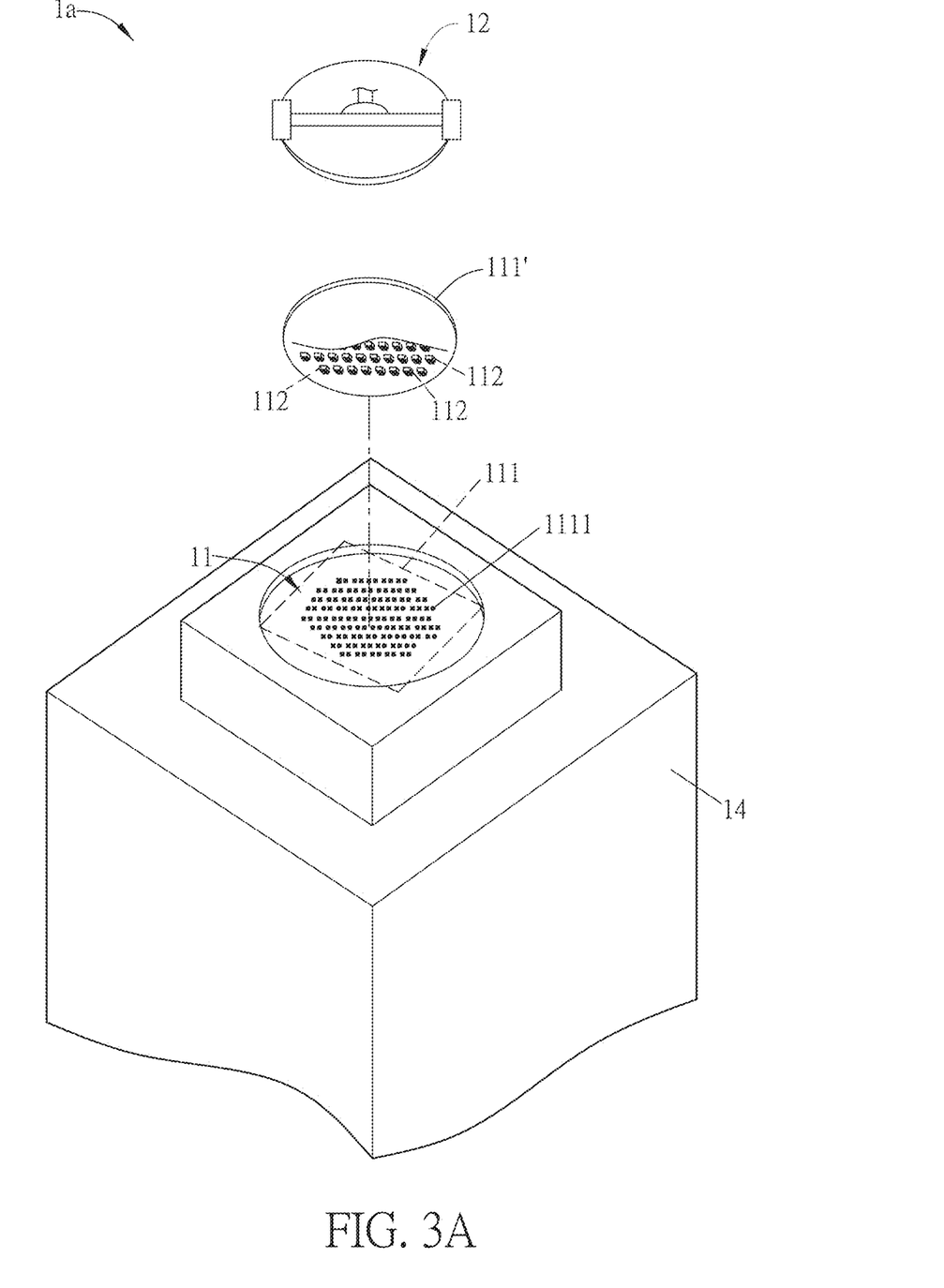
FIG. 3A is a schematic diagram showing the relative positions of the circuit substrate, the photoelectric components and the detector of the electronic device in the electronic detection system according to another embodiment of this disclosure.
Figure 3B:
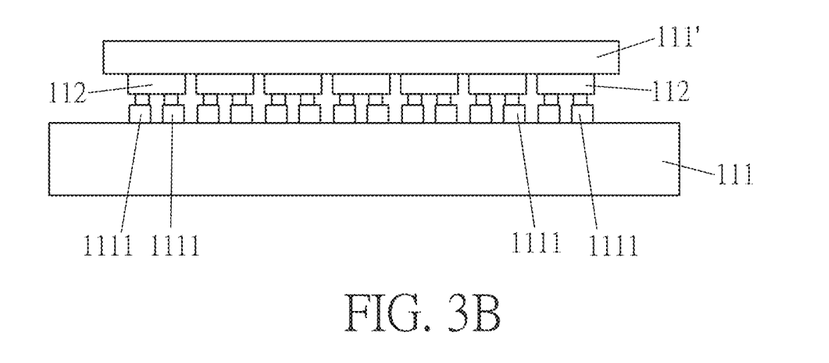
FIG. 3B is a schematic diagram showing the circuit substrate and the photoelectric components arranged on the carrier board of the electronic device in the electronic detection system of FIG. 3A.
Figure 3C:
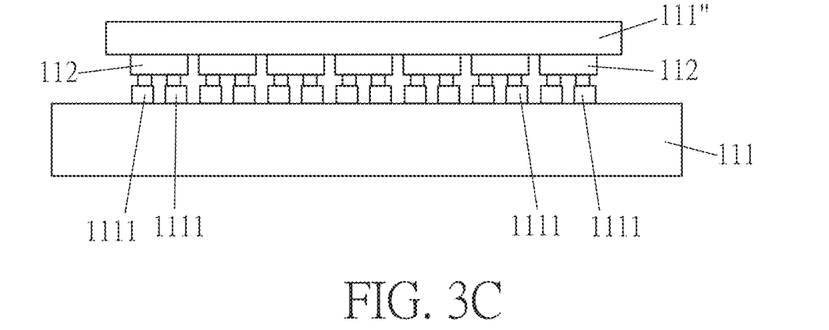
FIG. 3C is a schematic diagram showing the circuit substrate and the photoelectric components arranged on the stamp of the electronic device in the electronic detection system according to another embodiment of this disclosure.

FIG. 3A is a schematic diagram showing the relative positions of the circuit substrate and the photoelectric components of the electronic device and the detector in the electronic detection system according to another embodiment of this disclosure, FIG. 3B is a schematic diagram showing the circuit substrate and the photoelectric components arranged on the carrier board of the electronic device in the electronic detection system of FIG. 3A, and FIG. 3C is a schematic diagram showing the photoelectric components arranged on the stamp and the circuit substrate in the electronic detection system according to another embodiment of this disclosure. To be noted, in FIG. 3A, the photoelectric components 112 are arranged on the lower surface of the carrier board 111' facing the circuit substrate 111.

As shown in FIGS. 3A and 3B, in this embodiment, for example, a plurality of photoelectric components 112 arranged in an array are disposed on the lower surface of the carrier board 111' facing the circuit substrate 11. The carrier board 111' can be a native substrate, such as, for example but not limited to, a wafer, and the circuit substrate 111 is still used to provide electrical connections with the photoelectric components 112 in a freely detachable manner for using the tunable current source circuits 113 to drive the photoelectric components 112 to emit light (electroluminescence).

In another embodiment, as shown in FIG. 3C, the stamp 111" is an elastic object used for large-scale transfer of the photoelectric components 112, and the photoelectric components 112 (e.g. arranged in an array) are disposed on the lower surface of the stamp 111" facing the circuit substrate 111. The circuit substrate 111 is still used to provide electrical connections with the photoelectric components 112 in a freely detachable manner for driving the photoelectric components 112 to emit light. In this case, the stamp 111" is a temporary elastic object and is configured to temporarily support and transfer the photoelectric components 112. Herein, the stamp 111" is not limited by the initial position or the final position of the transferring process.

In addition, this disclosure also provide an electronic detection system, which includes an electronic device, a detector and a memory. The electronic device includes a plurality of photoelectric components and a plurality of tunable current source circuits. Each of the photoelectric components has one or more peak emission wavelengths in response to a light energy. The detector is separated from the electronic device with a predetermined distance, and the detector captures a feature value of a corresponding one of the photoelectric components. The memory stores one or more lookup tables, and the one or more lookup tables are based on the feature values and the current values of the photoelectric components. The tunable current source circuits are electrically connected to the photoelectric components, and each of the tunable current source circuits transmits an input current to a corresponding one of the photoelectric components in response to the one or more lookup tables to perform a selected one of the peak emission wavelengths. In one embodiment, the electronic device further includes a circuit substrate, and the photoelectric components are arranged on the circuit substrate. In another embodiment, the photoelectric components can be arranged on a carrier board. In another embodiment, the photoelectric components can be arranged on a stamp. To be noted, the above arrangements are for illustrations only, and this disclosure is not limited thereto.

In one embodiment, a photon releaser is further provided. When the photon releaser works to release photons so as to provide the light energy, the photoelectric components can be triggered by the light energy and thus emit light. In this case, the photoelectric components are photoluminescence components instead of electroluminescence components.

In one embodiment, the photon releaser provides a light with a wavelength less than a wavelength of the photoelectric component. For example, the photon releaser provides a light with the wavelength less than the wavelength of a red LED, the photon releaser provides a light with the wavelength less than the wavelength of a green LED, the photon releaser provides a light with the wavelength less than the wavelength of a blue LED, or the photon releaser provides a light with the wavelength less than the wavelengths of red, green and blue LEDs. This disclosure is not limited thereto.

To be noted, the other technical features of the electronic detection system of this embodiment can be referred to the above-mentioned electronic detection system 1 (or 1*a*) of the previous embodiment, so the detailed description thereof will be omitted.

Figure 4A:
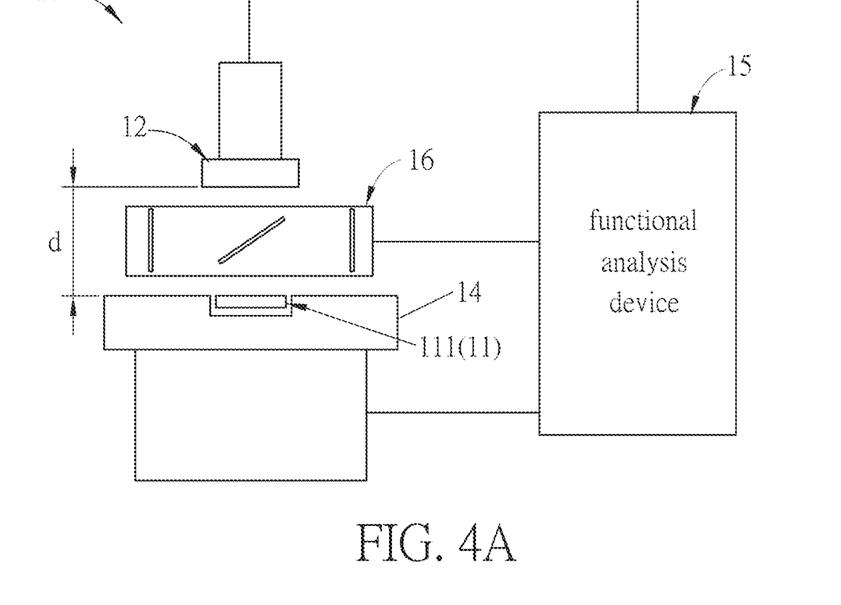
FIG. 4A is a schematic graph showing the wavelength and light intensity (brightness) of the photoelectric component (measured by Michelson interferometer) in the electronic detection system according to another embodiment of this disclosure.
Figure 4B:
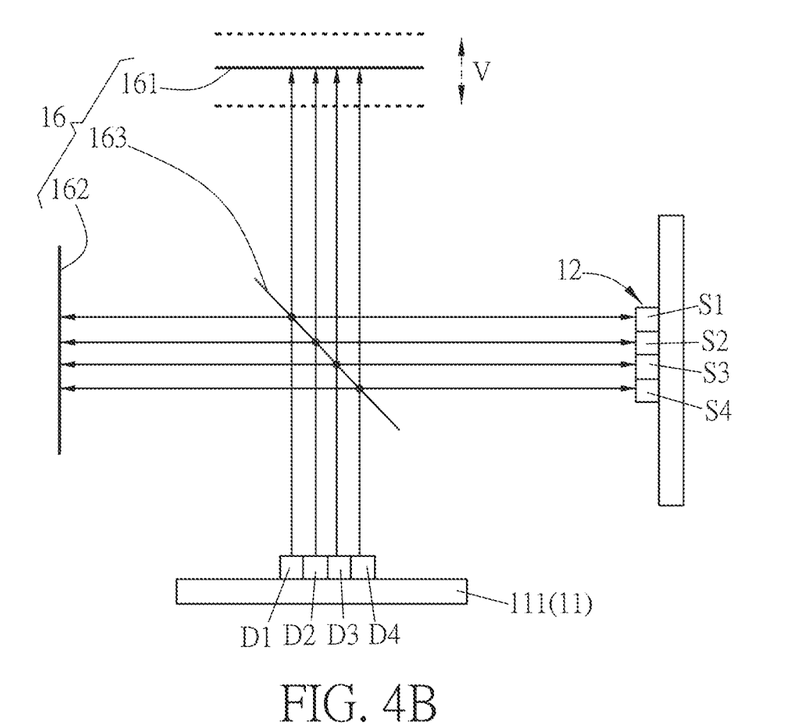
FIG. 4B is a schematic diagram showing the operation of the Michelson interferometer of FIG. 4A.
Figure 4C:
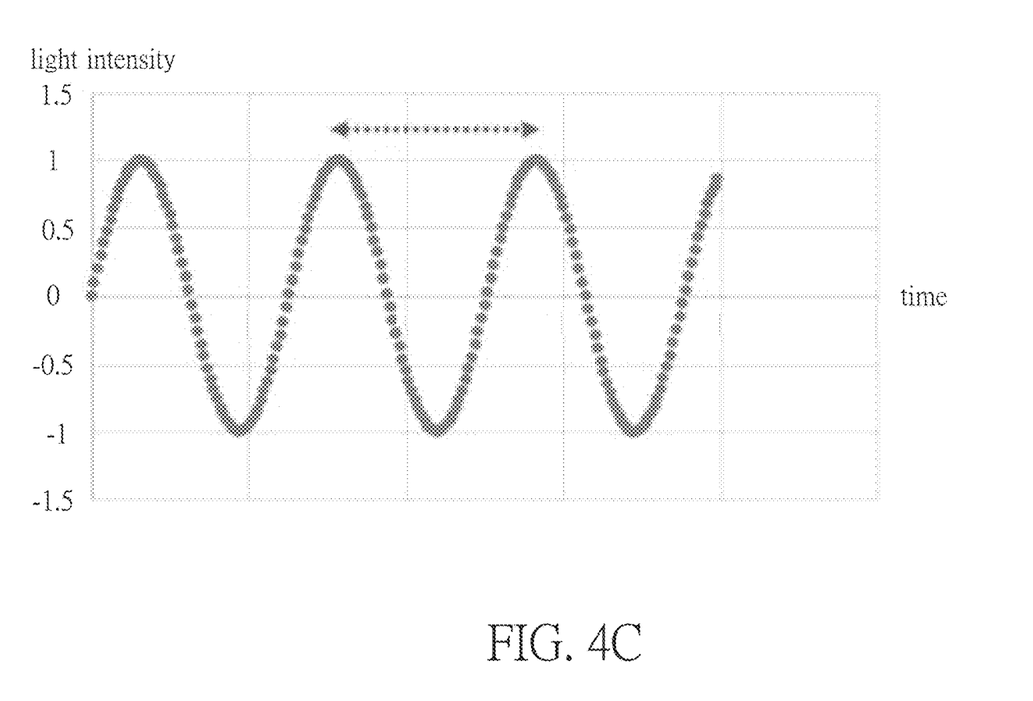
FIG. 4C is a schematic diagram showing the variation of light intensity of the photoelectric component measured by the detector of the electronic detection system according to another embodiment of this disclosure.

FIG. 4A is a schematic graph showing the wavelength and light intensity (brightness) of the photoelectric component measured by Michelson interferometer 16 of the electronic detection system 1*b* according to another embodiment of this disclosure, FIG. 4B is a schematic diagram showing the operation of the Michelson interferometer 16 of FIG. 4A, and FIG. 4C is a schematic diagram showing the variation of light intensity of the photoelectric component measured by the detector 12 of the electronic detection system 1*b*. To be noted, in FIG. 4A, the memory 13 of the electronic detection system 1*b* is not shown.

As shown in FIG. 4A, the electronic device 11 (circuit substrate 111) is still installed on the work platform 14. Unlike the electronic detection systems of the previous embodiments, the detector 12 and the electronic device 11 (circuit substrate 111) of this embodiment are arranged with a predetermined distance d along a predetermined direction. In addition, the electronic detection system 1*b* of this embodiment further includes a functional analysis device 15 and a Michelson interferometer 16. The Michelson interferometer 16 is disposed between the detector 12 and the electronic device 11 (circuit substrate 111), and the functional analysis device 15 is electrically connected to the detector 12, the Michelson interferometer 16 and the electronic device 11 respectively. The light emitted from the photoelectric components 112 can be processed by the Michelson interferometer 16 and then be absorbed by the detector 12 to be converted into electrical signals. The electrical signals can be transmitted to the functional analysis device 15. In this case, in addition to providing a photosensitive function for capturing images (and capable of analyzing light intensity and wavelength), the detector 12 can further cooperate with the functional analysis device 15 for providing functional configuration. For example, it can transmit at least one image parameter, which is directly retrieved along with the image capture process, to the functional analysis device 15. In another case, the detector 12 can perform a pretreatment to the retrieved image parameter, and then transmit the processed image parameter to the functional analysis device 15. This disclosure is not limited thereto. The models and applications of the functional analysis device 15 are extremely wide. This embodiment is only a simplified illustration, and the disclosure is not limited thereto.

In addition, the Michelson interferometer 16 in FIG. 4B includes a movable reflector 41, a fixed reflector 42 and a beam splitter 43. The reflector can be, for example, a mirror. In FIG. 4B, for example, four photoelectric components D1 to D4 are provided on the circuit substrate 111, and the detector 12 includes four sensing components S1 to S4, which are disposed corresponding to the photoelectric components D1 to D4. To be note, this disclosure is not limited thereto. In different embodiments, the amount and arrangement of the photoelectric components and the sensing components are not limited. In this embodiment, the photoelectric components D1 to D4 are, for example, LEDs, and the sensing components S1 to S4 are, for example, CMOS image sensors or CCDs. There components can be arranged in one-dimension or two-dimension, and this disclosure is not limited thereto.

As mentioned above, when enabling multiple photoelectric components D1 to D4 (LEDs) to emit light simultaneously by using electroluminescence (EL) method or photoluminescence (PL) method, the light emitted by these photoelectric components D1 to D4 is converted into collimated light through a lens. The collimated light then passes through the beam splitter 163 of the Michelson interferometer 16 and is reflected by the movable reflector 161 and the fixed reflector 162. Herein, the movable reflector 161 has a moving speed of V with respect to the circuit substrate 111. Subsequently, the modulated light signals generated after passing through the beam splitter 163 are received by an array detector 13 (sensing components S1 to S4). Accordingly, the light emitted from each of the photoelectric components D1 to D4 can be absorbed by one or more detector pixels (sensing components S1 to S4) and converted into electrical signals. These electrical signals can be transmitted to the functional analysis device 15 for further processing and analyzing as shown in FIG. 4C. In this case, the intensity variations of the electrical signals corresponding to the modulated light emitted by each of the photoelectric components D1 to D4 is equal to $2V/\lambda$ (i.e., a frequency f), where $\lambda$ is the wavelength of the light emitted by the LED. The intensity of the electrical signals is in proportional to the light intensity emitted by the photoelectric components D1 to D4. By performing a Fourier transformation of the electrical signals of the detector 12, the functional analysis device 15 can obtain the aforementioned frequency f, allowing for the calculation of the wavelength $\lambda$ for each LED. After calibration, the light intensity (brightness) of each LED can also be determined.

In summary, in the electronic detection system of this disclosure, each photoelectric component has one or more peak emission wavelengths in response to a plurality of current values, a plurality of tunable current source circuits are electrically connected to the photoelectric components, the detector captures a feature value of a corresponding one of the photoelectric components, and the memory stores one or more lookup tables, which are based on the feature values and the current values of the photoelectric components. Each of the tunable current source circuits transmits an input current to a corresponding one of the photoelectric components in response to the one or more lookup tables to perform a selected one of the peak emission wavelengths. According to this design, the electronic detection system of this disclosure can achieve the wavelength compensation function.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:
1. An electronic detection system, comprising:
  an electronic device, comprising:
    a circuit substrate, a plurality of photoelectric components electrically connected to the circuit substrate, wherein each of the photoelectric components has one or more peak emission wavelengths in response to a plurality of current values, and a plurality of tunable current source circuits disposed on the circuit substrate and electrically connected to the photoelectric components;

a detector separated from the electronic device with a predetermined distance, wherein the detector captures a feature value of a corresponding one of the photoelectric components; and a memory storing one or more lookup tables, wherein the one or more lookup tables are based on the feature values and the current values of the photoelectric components;

wherein, each of the tunable current source circuits transmits an input current to a corresponding one of the photoelectric components in response to the one or more lookup tables to perform a selected one of the peak emission wavelengths.

2. The electronic detection system of claim 1, wherein the feature value comprises an emission wavelength value of the corresponding one of the photoelectric components.

3. The electronic detection system of claim 2, wherein the feature value further comprises an environmental temperature value corresponding to the emission wavelength value.

4. The electronic detection system of claim 2, wherein the feature value further comprises a brightness value corresponding to the corresponding one of the photoelectric components.

5. The electronic detection system of claim 1, wherein the detector and the photoelectric components are arranged in a one-on-multiple manner, and the detector captures an overall image of the photoelectric components.

6. The electronic detection system of claim 1, wherein the electronic device comprises a plurality of pixels, and each of the pixels comprises one or at least two of the photoelectric components.

7. The electronic detection system of claim 1, wherein a wavelength range of the peak emission wavelength of each of the photoelectric components is within 10 nm.

8. The electronic detection system of claim 1, wherein a wavelength range of the peak emission wavelength of each of the photoelectric components is 30 nm or more.

9. The electronic detection system of claim 1, wherein the photoelectric components are arranged on the circuit substrate, a carrier board or a stamp.

10. The electronic detection system of claim 1, further comprising:

a Michelson interferometer disposed between the detector and the electronic device; and a functional analysis device electrically connected to the detector and the Michelson interferometer;

wherein, lights emitted from the photoelectric components are processed by the Michelson interferometer and then absorbed by the detector so as to be converted into electrical signals, and the electrical signals are transmitted to the functional analysis device.

* * * * *